United States Patent [19]

Lucas

[11] 4,376,753
[45] Mar. 15, 1983

[54] CORROSION PROTECTION SYSTEM FOR NUCLEAR POWER PLANT

[75] Inventor: Robert G. Lucas, Stanford, Calif.

[73] Assignee: Electric Power Research Institute, Palo Alto, Calif.

[21] Appl. No.: 105,752

[22] Filed: Dec. 20, 1979

[51] Int. Cl.³ .............................................. G21C 19/32
[52] U.S. Cl. .................... 376/305; 204/147; 204/149
[58] Field of Search .............. 176/37, 38, 92 R, 86 L; 204/147, 196, 149

[56] References Cited

U.S. PATENT DOCUMENTS

| | | | |
|---|---|---|---|
| 2,864,731 | 12/1958 | Gurinsky et al. | 176/38 |
| 2,887,373 | 5/1959 | Winkler et al. | 176/37 |
| 3,013,909 | 12/1961 | Pancer et al. | 176/37 |
| 3,030,296 | 4/1962 | McGlasson et al. | 204/266 |
| 3,141,971 | 7/1964 | Parker | 176/38 |
| 3,691,040 | 9/1972 | Sudrabin et al. | 204/196 |
| 3,718,556 | 2/1973 | Rohrback | 204/149 |
| 3,951,207 | 4/1976 | Baumann et al. | 204/196 |
| 4,036,716 | 7/1977 | Hulthe | 204/196 |
| 4,073,712 | 2/1978 | Means et al. | 204/186 |
| 4,138,323 | 2/1979 | Statsenko et al. | 204/147 |

FOREIGN PATENT DOCUMENTS 11477754 7/1965 United Kingdom .

OTHER PUBLICATIONS

NACE Basic Corrosion Course (1970) pp. 5-36-5-37.
Elements of Materials Science, 2nd Ed., p. 355.
P. E. H. Heathfield, An Electrolytic System for Controlling Corrosion and Marine Growth, Sep. 1970, Underwater Science and Technology Journal vol. 2, No. 3.

*Primary Examiner*—Sal Cangialosi
*Attorney, Agent, or Firm*—Flehr, Hohbach, Test, Albritton & Herbert

[57] ABSTRACT

A cathodic corrosion protection system for a nuclear power plant which employs an ion tank adjacent the main fresh water feed pipe leading to the steam generator to treat water from the main feed pipe and then return the treated water to the main feed pipe to form a corrosion protecting alkaline layer on surfaces of the main feed pipe and the secondary side of the steam generator. The ion tank receives measured amounts of hydrazine to render the water therein substantially conductive and contains ionizable metal anodes which release free metal ions as electric current flows between the anodes and a cathode connection on an ion tank outlet pipe near the main feed water pipe.

9 Claims, 6 Drawing Figures

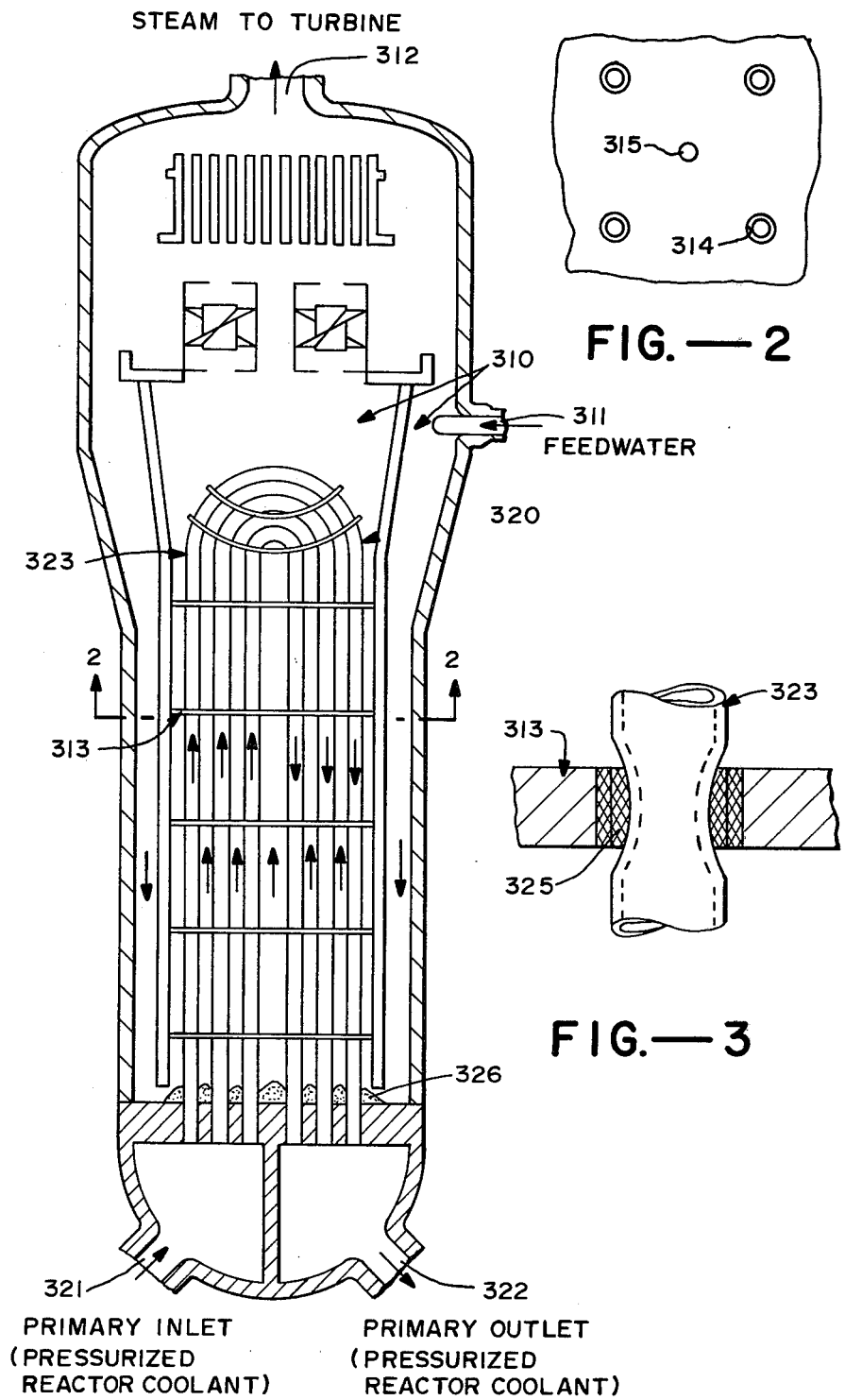

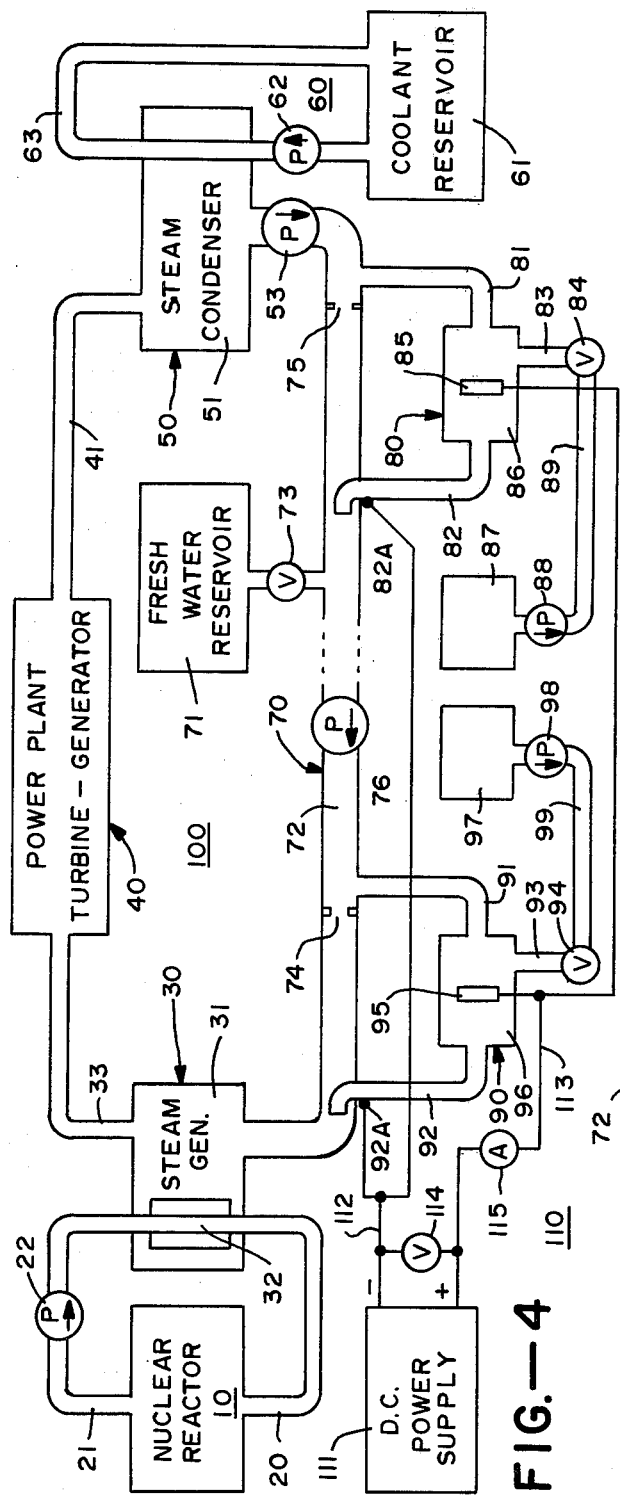
FIG.—4
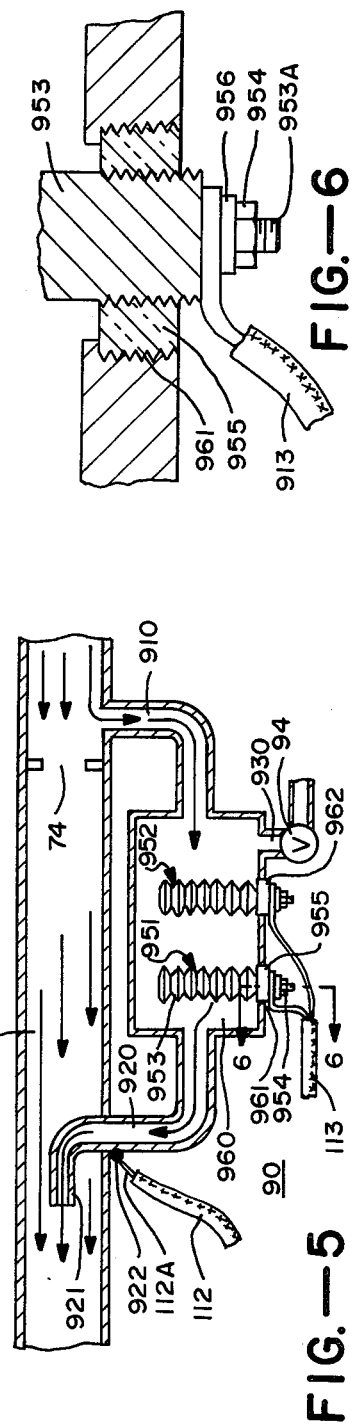
FIG.—6
FIG.—5

CORROSION PROTECTION SYSTEM FOR NUCLEAR POWER PLANT

This invention relates generally to corrosion protection systems, and more specifically, to a corrosion protection system for a nuclear power plant.

Many nuclear power plants in use today are of the pressurized variety. These power plants generally include a steam generator which utilizes high temperature, pressurized water from the reactor on the primary side to heat pure water on the secondary side. A number of these power plants which have been in operation for various periods of time have begun to encounter operating problems due to certain corrosion phenomena occurring in the secondary plant and the steam generator. One of the more serious of these problems involves denting of the primary heat transfer tubes which can adversely affect the flow of pressurized water through the tubes and may ultimately cause a tube wall integrity failure and force a shutdown of the steam generator for repairs. The nature of this denting problem can be understood from a consideration of the structure of the steam generator as depicted in FIG. 1 of the attached drawings.

Steam generator 300 comprises a secondary structure 310 and a primary structure 320. Inlet 311 is utilized to introduce preheated feedwater into the steam generator, and an outlet 312 is utilized to withdraw steam for running the power plant turbine. Pressurized, high temperature water from the reactor enters inlet plenum 321 and flows through a multiplicity of tubes comprising tube bundle 323 which extends approximately two-thirds to three-fourths of the total height of steam generator 300 which may be as much as eighty feet tall. A plurality of support plates 313 extend transversely across the heat exchanger at regular intervals for supporting the individual heat exchanger tubes in tube bundle 323. As shown in FIG. 2, each of the apertures 314 in the individual support plates 313 has a diameter slightly larger than the external diameter of the heat exchanger tubes 323 extending therethrough and may have flowholes such as 315 therein. After traversing the heat exchanger tubes 323, the pressurized water is returned to the reactor for reheating via outlet plenum 322.

As depicted in FIG. 3 of the attached drawings, during operation of the steam generator, corrosion products 325—principally nonprotective magnetite ($FE_3O_4$)—build up in the gap between the outer surface of each primary heat exchanger tube 323 and the surface of the carbon steel support plate 313. Free oxygen for formation of the corrosion products 325 on the steel support plate is produced during the reduction reaction involved in formation of corrosion products of copper and nickel in the steam generator. As the thickness of this deposit 325 grows, it compresses or dents heat exchanger tube 323 as shown.

Another problem that exists generally in nuclear power plants as well as other power plants utilizing steam generation equipment is the deposition of suspended solids composed mainly of corrosion products formed in the feed train of the power plant. The buildup of these suspended solids as sludge 326 in the steam generator 300 of FIG. 1 can be eliminated to some extent by a continuous small percentage blowdown of the steam generator water, but this removes thermal energy from the steam generator and lowers overall plant efficiency.

It is apparent that an effective corrosion protection system for steam generators and feed trains is highly desirable to alleviate the denting and sludge build-up problems otherwise encountered. While cathodic corrosion protection systems have been proven effective in preventing corrosion in feed water systems on submarines and ocean-going vessels which utilize brackish or salt water, such systems will not work directly in a nonconductive fresh water feed system.

It is an object of this invention to provide an effective corrosion protection system for power plants which utilize fresh water feed systems. More specifically, it is an object of this invention to provide a cathodic corrosion protection system for the fresh water feed train in a pressurized water nuclear power plant to alleviate corrosion in the steam generator and denting of steam generator tubes.

This invention features a cathodic corrosion protection system for use in a power plant adapted to use fresh water as the working fluid and having a steam generator and a feed system including a main feed pipe for supplying fresh water to the steam generator. A cathodic corrosion protection system in accordance with this invention generally comprises a source of electrically conductive fluid such as hydrazine; an ion tank located adjacent the main feed pipe and having a first inlet communicating with the main feed pipe to draw fresh water into the ion tank, an outlet communicating with the main feed pipe to return treated water thereto, and a second inlet communicating with the source of electrically conductive fluid, a valve means associated with the second inlet to control the introduction of metered amounts of the conductive fluid into the ion tank to render the water flowing therethrough substantially conductive; at least one ionizable metal anode mounted in the ion tank; and means supplying a positive direct current voltage to the anode and a negative direct current voltage to a wall of the outlet to produce an electric current through the conductive liquid in the tank, resulting in treated water being returned to the main feed pipe to form a protective coating on interior walls of the feed pipe and the interior surfaces in the steam generator for reducing the rate of formation of corrosion products on these surfaces.

In a preferred embodiment, the outlet of the ion tank comprises a pipe having a diameter substantially smaller than the diameter of the main feed pipe and a discharge section of said pipe is located centrally in the main feed pipe to distribute the treated water more uniformly throughout the stream of fresh water flowing through the main feed pipe. Further, in accordance with one feature of the invention, the main feed pipe includes an orifice of a prearranged size between the inlet and outlet of the ion tank to produce a fluid pressure differential of prearranged magnitude therebetween to cause fresh water from the main feed pipe to flow through the ion tank and past the anode at a prearranged flow rate. In some instances, the use of two or more anodes may be preferred.

When utilized in a pressurized water nuclear power plant, this invention features the use of two separate cathodic corrosion protection systems, one located immediately prior to the steam generator to provide principal corrosion protection for the surfaces of the steam generator, and a second system located immediately after the condensate pump which returns fresh water to the main feed pipe to provide corrosion protection for surfaces of structures involved in the liquid feed train.

While the actual mechanism of corrosion protection is not completely understood, it is believed that corrosion protection is provided by the system of this invention by the formation of a protective alkaline coating on the surfaces of the main feed pipe and the steam generator. This alkaline coating is apparently deposited as free metal ions are released from the anode in the ion tank as electric current passes between the anode and the cathode system. The thin alkaline coating built up on the surfaces of the steam generator will not substantially inhibit heat transfer between the heat exchanger tubes and the water flowing through the secondary heat exchanger compartment. However, the coating will inhibit formation of corrosion products on steam generator surfaces which contain copper and nickel and thus inhibit the formation of magnetite deposits which cause denting of the heat exchanger tubes. When a corrosion protection system is also employed at the outlet of the condensate pump, the protective coating formed on surfaces of pipes and other apparatus in the fresh water feed train will reduce corrosion formation on these surfaces and reduce sludge buildup in the steam generator.

Other features and advantages of this invention will be apparent from a consideration of the detailed description given below in conjunction with the accompanying drawings.

FIG. 1 is a sectioned, elevational view of a recirculating steam generator utilized in a pressurized water nuclear power plant.

FIG. 2 is a fragmented section view of a portion of a support plate and primary heat exchanger tube taken along the lines 2—2 in FIG. 1.

FIG. 3 is a fragmented section view of a portion of a support plate and a primary heat exchanger tube in a steam generator showing the problem of denting.

FIG. 4 illustrates schematically a pressurized water nuclear power plant utilizing cathodic protection systems in accordance with this invention.

FIG. 5 is a partly sectioned, elevational view illustrating the details of a cathodic protection system in accordance with this invention.

FIG. 6 is a fragmented section of a portion of a cathodic protection system taken along the lines 6—6 in FIG. 5.

The steam generator depicted in FIG. 1 and the problem with denting of the steam generator primary heat exchanger tubes 323 as shown in FIG. 3 have been described above. FIG. 4, which is a simplified flow diagram with no feed water heaters or moisture separator reheaters shown, illustrates a nuclear power plant which incorporates cathodic corrosion protection systems in accordance with this invention. The main components of a pressurized water nuclear power plant are a nuclear reactor 10, a pressurized water system 20, a steam generator 30, a power plant turbine 40, a steam condenser 50, a coolant system 60, and a fresh water feed train 70. The pressurized water system 20 associated with nuclear reactor 10 includes piping 21 through which high temperature, pressurized water (e.g., 2,000 psi, or 550° F.) is pumped by a pumping system shown as one pump 22 for simplicity of illustration to the steam generator 30. After passing through the steam generator tube bundle 32, (320 in FIG. 1), the pressurized water is returned via piping 23 to nuclear reactor 10.

Fresh water from a main feed pipe 72 is pumped via a pump 76 to the secondary side 31 of steam generator 30 where the feed water is converted to steam by heat transferred from the high temperature water flowing through the tube bundle 32. Steam produced in steam generator 30 is piped through outlet piping 33 to a power plant turbine-generator system 40 where it is utilized to generate electric power.

Low enthalpy, saturated steam from the turbine-generator 40 is piped via exhaust trunk 41 to a steam condenser 50. Steam condenser 50 comprises another heat exchanger in which steam is condensed to water by transferring heat to a liquid coolant flowing through a tube bundle 52. Cooling water is supplied by a pumping system shown as one pump 62 for simplicity of illustration from a coolant reservoir 61 through a piping system 63. Coolant reservoir 61 may be a closed cooling tower system or a large body of water such as an ocean, a lake, or a reservoir.

The water formed in steam condenser 50 is pumped via a condensate pump 53 back into the main feed water train 70. A fresh water reservoir 71 may be utilized to replenish water in the main feed train 70 under the control of a valve 73.

In accordance with this invention, a cathodic corrosion protection system is added to the main feed water system to reduce the rate of formation of corrosion products in the steam generator. In a preferred embodiment, at least two separate cathodic corrosion protection systems are employed. The first protection system 90 is located as shown in FIG. 4 immediately prior to steam generator 30, and the second protection system 80 is located just after condensate pump 53. The corrosion protection systems 80 and 90 are identical in their structure and operation and will be described together.

Each of the cathodic corrosion protection systems 80 and 90 includes an ion tank 86, 96 with an inlet pipe 81, 91 communicating with main feed pipe 72 to draw fresh water into ion tank 86, 96. A second inlet 83, 93 communicates via a piping system 89, 99 with a tank 87, 97 which contains an electrically conductive fluid, such as hydrazine. A pump 88, 98 is provided in piping system 89 to pump the electrically conductive fluid through a metering valve 84, 94 into ion tank 86, 96. A metal anode system 85, 95 is mounted in each ion tank 86, 96. Outlet piping 82, 92 communicates with main feed pipe 72 to return treated water from ion tank 86, 96 to the main feed water train. Orifices 74 and 75 formed in main feed water pipe 72 provide a pressure differential which causes feed water to enter inlets 81, 91 and flow through ion tank 86, 96.

A DC power supply 11 provides positive and negative direct current voltages on cables 112 and 113. Cable 113 conducts the positive direct current voltage to anode systems 85 and 95. Correspondingly, cable 112 conducts the negative direct current to cathode connection points 82A, 92A. A voltmeter 114 may be provided to monitor the direct current voltage between the positive and negative lines 113 and 112 and an ammeter 115 may be provided in, for example, line 113 to monitor the direct current flowing between anode system 85, 95 and cathode connection point 82A, 92A.

FIGS. 5 and 6 depict the structure of cathodic corrosion protection system 90 in greater detail. As shown in FIG. 5, a pair of metal nodes 951 and 952 are mounted in ion tank 960. Anodes 951 and 952 each comprise a consumable metal anode section 953 located in ion tank 960, a feedthrough collar 955, and a cable connector 954. As shown in FIG. 6, feedthrough collar 955 comprises a ring of electrically insulating material which is utilized to mount anode section 953 in a threaded aperture 961 in the bottom wall of ion tank 960. A threaded stud portion 953A is provided on the bottom of metal anode 953 in order that cable 113 may be fastened thereto with a combination of a lock washer 956 and a nut 954. In this fashion, the anode 953 which will be consumed during the operation of the cathodic protection system can readily be removed and replaced in ion tank 960. It will be appreciated that many other approaches to mounting anode 953 in ion tank 960 and connecting cable 113 thereto could be provided. The structure shown in FIG. 6 is merely one exemplary approach that could be employed. The materials of the walls of ion tank may be a conductive metal as shown in FIG. 5, in which case all of the walls of the tank serve as a cathode. Alternatively, the ion tank walls could be generally formed of a nonconductive material such as fiberglass with a metal cathode element mounted in or on outlet pipe 920.

As shown in FIG. 5, anode section 953 is provided with a configuration which maximizes the exposure to water flowing over the anode. Outlet pipe 920 has a discharge section 921 which is located centrally in main feed pipe 72, such that treated water will be thoroughly mixed with the main feed water flowing through feed pipe 72. Cathode cable 112 has its conductive portion 112A connected to outlet pipe 920 at a point 922 close to the point where outlet pipe 920 enters main feed pipe 72.

The operation of cathodic protection system 90 will be briefly described. Metered amounts of an electrically conducting fluid, such as hydrazine, are pumped through metering valve 94 and inlet 930 into ion tank 960 where the hydrazine mixes with fresh water entering ion tank 960 through inlet 910. A sufficient amount of conductive hydrazine is added to render the mixture flowing past anodes 951 and 952 substantially conductive. As a result, a DC current flows between anodes 951 and 952 and the walls of ion tank 960 which are at a lower potential. Due to the passage of this electric current, free metal ions are released from anodes 951 and 952 and enter the stream of water exiting ion chamber 960 through outlet pipe 920. These free metal ions are carried out into the main feed pipe 72 and steam generator 30 (FIG. 4) where, over a period of time, they result in the buildup of a protective alkaline coating on the walls of main feed pipe 72 and on the surfaces in secondary portions of steam generator 30. In addition, any hydrogen which is released from the pipe walls helps to minimize corrosion by serving as an additional scavenger for oxygen which may be present in small quantities in the feed water pipe 72 or the steam generator 30.

Referring to FIG. 4, cathodic corrosion protection system 80 located just after condensate pump 53 provides for the formation of a protective alkaline coating along the walls of feed pipe 72, thereby minimizing the rate of formation of corrosion products on the walls of main feed pipe 72. This will reduce the amount of sludge being carried through feed pipe 72 into steam generator 30.

Cathodic corrosion protection system 90 provides for the formation of a protective alkaline coating on surfaces of components in steam generator 30. This protective alkaline coating reduces the rate of formation of corrosion products on the walls of iron and/or iron alloy materials utilized in components such as the support plates in steam generator 30. In particular, the protective alkaline coating together with the slightly basic pH in the water surrounding the heat exchanger tubes passing through apertures in the carbon steel support plate in steam generator 30 should reduce the formation of corrosion products and reduce or eliminate the problem of denting of the heat exchanger tubes.

While this invention has been described above in connection with a preferred embodiment showing its utilization in a pressurized water nuclear power plant, it should be apparent that the invention may be applied in any fresh water feed system utilized for steam generation in other types of power plants. It should also be understood that numerous changes could be made in the exemplary embodiments described without departing from the scope of the invention. For example, separate DC power supplies could be utilized for each of the cathodic corrosion protection systems 80 and 90 shown in FIG. 4. In addition, it may be possible to utilize a single tank for supplying hydrazine to both ion tanks 86 and 96. Instead of utilizing orifices 74 and 75 to generate pressure differentials for forcing feed water into ion tanks 86 and 96, pumps could be provided in each of the inlet pipes 81 and 91 to pump fresh water at a predetermined rate from main feed pipe 72 into ion tanks 86 and 96.

What is claimed is:

1. In a power plant adapted to use fresh water as the working fluid and having a steam generator and a feed system including a main feed pipe for supplying fresh water to the secondary side of said steam generator, a cathodic corrosion protection system comprising a source of electrically conductive fluid; an ion tank located proximate said main feed pipe and having a first inlet communicating with said main feed pipe to draw fresh water into said ion tank, and outlet communicating with said main feed pipe to return treated water thereto, and a second inlet communicating with said source of electrically conductive fluid; valve means associated with said second inlet to control the introduction of metered amounts of said conductive fluid into said ion tank to render the liquid flowing therethrough substantially conductive; at least one ionizable metal anode mounted in said ion tank; and means supplying a positive direct current voltage to said anode and a negative direct current voltage to at least one conductive wall portion of said outlet to produce an electric current through said conductive liquid in said ion tank, resulting in treated water being returned to said main feed pipe to form a protective coating on interior walls of said main feed pipe and interior surfaces in said steam generator for reducing the rate of corrosion product formation on said surfaces.

2. Apparatus as claimed in claim 1, wherein said outlet comprises a pipe having a diameter substantially smaller than the diameter of said main feed pipe and having a discharge section located centrally in said main feed pipe to distribute said treated water more uniformly throughout a stream of fresh water flowing through said main feed pipe.

3. Apparatus as claimed in claim 1, wherein said main feed pipe includes an orifice of prearranged size between said inlet and outlet of said ion tank to produce a fluid pressure differential of prearranged magnitude therebetween to cause fresh water to flow through said ion tank past said anode at a prearranged rate.

4. Apparatus as claimed in claim 1, wherein said electrically conductive fluid is hydrazine.

5. In a nuclear power plant having a nuclear reactor; a steam generator comprising a bundle of heat exchanger tubes extending through the interior of said compartment, and support plates extending at intervals across said steam generator with apertures therein receiving said heat exchanger tubes; a pressurized water system for said reactor communicating with said heat exchanger tubes; a fresh water feed system including a main feed pipe for supplying fresh water to the secondary side of said steam generator to be converted into steam; a turbine-generator system receiving said steam for converting heat energy therein into electric power; and a steam condenser system communicating with said turbine-generator system to convert residual steam to water, including a condensate pump for returning said water to said fresh water feed system; a corrosion protection system for inhibiting corrosion in said fresh water feed system and said steam generator to reduce denting of said heat exchanger tubes, said corrosion protection system comprising a source of electrically conductive fluid; at least one ion tank located proximate one section of said main feed pipe and having a first inlet communicating with said main feed pipe to draw fresh feed water into said ion tank, an outlet communicating with said main feed pipe to return treated water thereto, and a second inlet communicating with said source of electrically conductive fluid; valve means associated with said second inlet for controlling the introduction of metered amounts of said conductive fluid into said ion tank to render the liquid flowing therethrough substantially conductive; at least one ionizable metal anode mounted in said ion tank; and means supplying a positive direct current voltage to said anode and a negative direct current voltage to at least one conductive wall portion of said outlet to produce an electric current through said conductive fluid in said tank, resulting in treated water being returned to said main feed pipe to form a protective coating on interior walls of said main feed pipe, exterior surfaces of said heat exchanger tubes, and surfaces of said support plates for reducing the rate of corrosion product formation on said surfaces.

6. Apparatus as claimed in claim 5, wherein a pair of said corrosion protection systems is provided, one of said corrosion protection systems being located proximate said condensate pump and the other of said corrosion protection systems being located proximate said steam generator.

7. Apparatus as claimed in claim 5 wherein said outlet comprises a pipe having a diameter substantially smaller than the diameter of said main feed pipe and having a discharge section located centrally in said main feed pipe to distribute said treated water more uniformly throughout the stream of fresh water flowing through said main feed pipe.

8. Apparatus as claimed in claim 5 wherein said main feed pipe includes an orifice of prearranged size located between said inlet and outlet of said ion tank to produce a fluid pressure differential of prearranged magnitude therebetween to cause fresh water to flow through said ion tank past said anode at a prearranged rate.

9. Apparatus as claimed in claim 5 wherein said electrically conductive fluid is hydrazine.

* * * * *